(12) United States Patent
Zenner et al.

(10) Patent No.: US 9,990,064 B2
(45) Date of Patent: Jun. 5, 2018

(54) ELECTRONIC DEVICE STACK ASSEMBLY (71) Applicant: Amazon Technologies, Inc., Seattle, WA (US)

(72) Inventors: Robert L. D. Zenner, San Jose, CA (US); Chin Siong Khor, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 473 days.

(21) Appl. No.: 14/667,389

(22) Filed: Mar. 24, 2015

(65) Prior Publication Data
US 2016/0282971 A1 Sep. 29, 2016

(51) Int. Cl.
G06F 3/041 (2006.01)
B32B 37/10 (2006.01)
B32B 37/12 (2006.01)
B32B 37/18 (2006.01)
G06F 3/044 (2006.01)

(52) U.S. Cl.
CPC .............. *G06F 3/041* (2013.01); *B32B 37/10* (2013.01); *B32B 37/1284* (2013.01); *B32B 37/18* (2013.01); *G06F 3/044* (2013.01); *B32B 2307/416* (2013.01); *B32B 2307/71* (2013.01); *B32B 2309/68* (2013.01); *B32B 2315/08* (2013.01); *B32B 2369/00* (2013.01); *B32B 2405/00* (2013.01); *B32B 2457/208* (2013.01); *G06F 2203/04103* (2013.01)

(58) Field of Classification Search
CPC .... H05K 1/023; H05K 1/0275; H05K 1/0283; H05K 1/0296
See application file for complete search history.

(56) References Cited

U.S. PATENT DOCUMENTS

| 6,902,454 | B1 | 6/2005 | Petruchik | |
|---|---|---|---|---|
| 8,177,598 | B2 | 5/2012 | Hata et al. | |
| 2014/0062939 | A1 | 3/2014 | Zehner et al. | |
| 2014/0150952 | A1* | 6/2014 | Sung | G02F 1/1303 156/64 |
| 2014/0192279 | A1 | 7/2014 | Akanuma et al. | |
| 2015/0004382 | A1* | 1/2015 | Menon | G06F 3/147 428/212 |
| 2015/0336357 | A1* | 11/2015 | Kang | B32B 15/18 428/215 |

FOREIGN PATENT DOCUMENTS

| EP | 1357420 A1 | 10/2003 |
|---|---|---|
| GB | 2500749 A | 1/2013 |

OTHER PUBLICATIONS

PCT Application No. PCT/US2016/023805, Search Report and Written Opinion dated Jun. 16, 2016, 13 pages.

\* cited by examiner

Primary Examiner — Olga Merkoulova
(74) Attorney, Agent, or Firm — K&L Gates LLP (57) ABSTRACT An electronic device includes a stack assembly. The stack assembly is provided with a stack of sub-assemblies such as a display for rendering content, front lighting layered on top of the display for illuminating the display, a capacitive touch sensor layered on top of the front lighting for detecting touch inputs, and a cover glass layered on top of the capacitive touch sensor. Each sub-assembly is adhered to another sub-assembly with a film optically clear adhesive before coupling sub-assemblies with each other, which forms a touch-sensitive front-lit display that is capable of accepting user input and rendering content in low ambient light conditions.

20 Claims, 10 Drawing Sheets

ELECTRONIC DEVICE STACK ASSEMBLY

BACKGROUND

Portable electronic devices, such as electronic book (e-book) readers or tablet computers, have become increasingly popular. Due to the time required to read lengthy novels or other types of e-books, thin and lightweight e-book readers are desirable in order to promote reading for hours at a time. Furthermore, the appearance and quality of the display of an e-book reader can affect the user's experience in viewing an e-book. Accordingly, there is a need for improved displays of electronic devices.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with aspects of the present invention, an electronic device, such as an e-book reader, may have a stack assembly or a component stack comprising a stack of sub-assemblies such as an electrophoretic display (EPD) for rendering content, a front lighting layered on top of the EPD for illuminating the EPD, and a capacitive touch sensor layered on top of the front lighting for detecting touch inputs. Furthermore, a cover glass may be layered on top of the capacitive touch sensor. Each sub-assembly may be adhered to another sub-assembly with a solid optically clear adhesive (OCA), such as an OCA film, which may form a touch-sensitive front-lit electrophoretic display that is capable of accepting user input and rendering content in low ambient light conditions. In some embodiments, the stack assembly may comprise a six inch, 300 dots per inch (DPI) electrophoretic display (EPD), electrowetting display and/or any other type of bi-stable display.

Figure 1A:
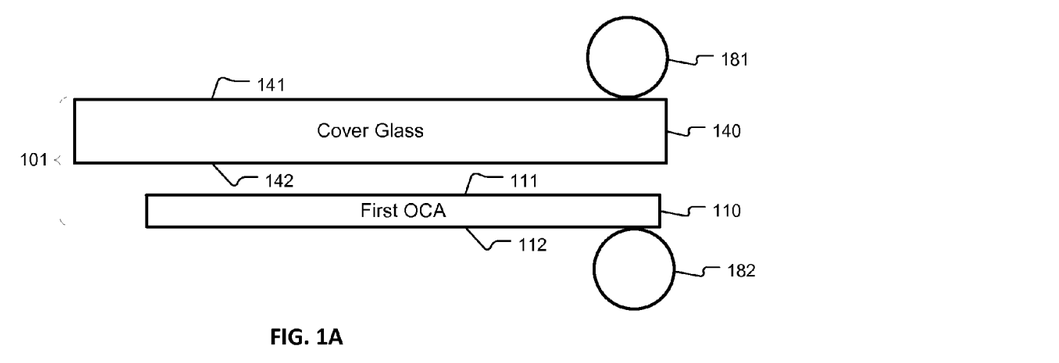
FIGS. 1A-1G illustrate example schematic cross-section views of a stack assembly being assembled, in accordance with embodiments of the present invention.
Figure 1B:
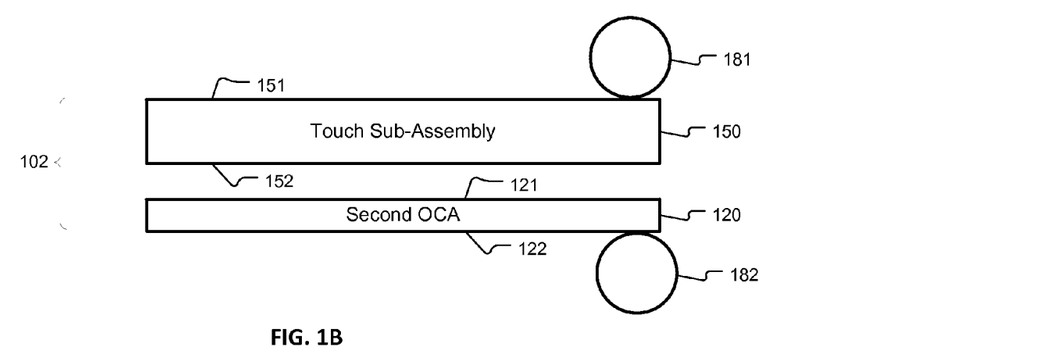
Figure 1C:
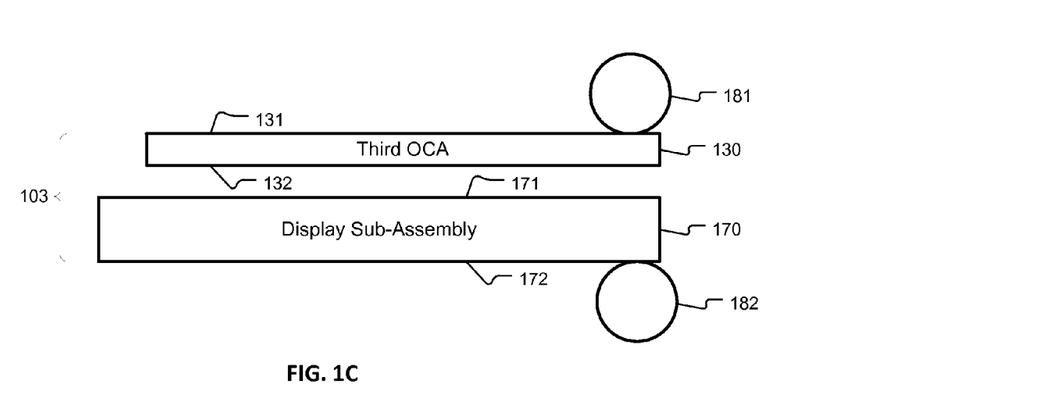
Figure 1D:
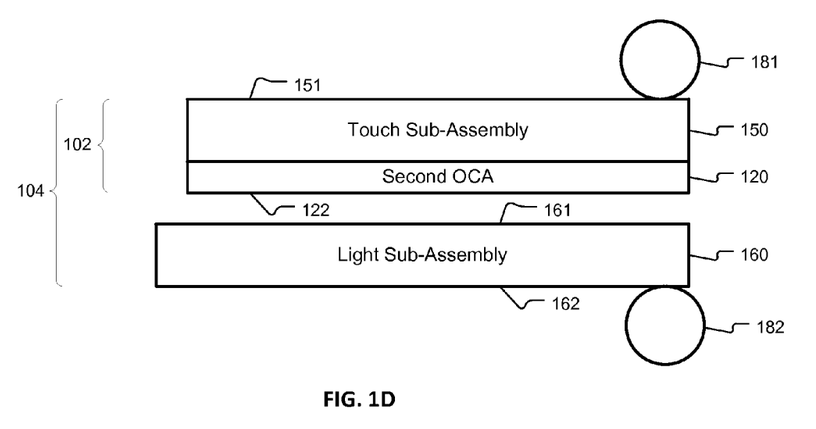
Figure 1E:
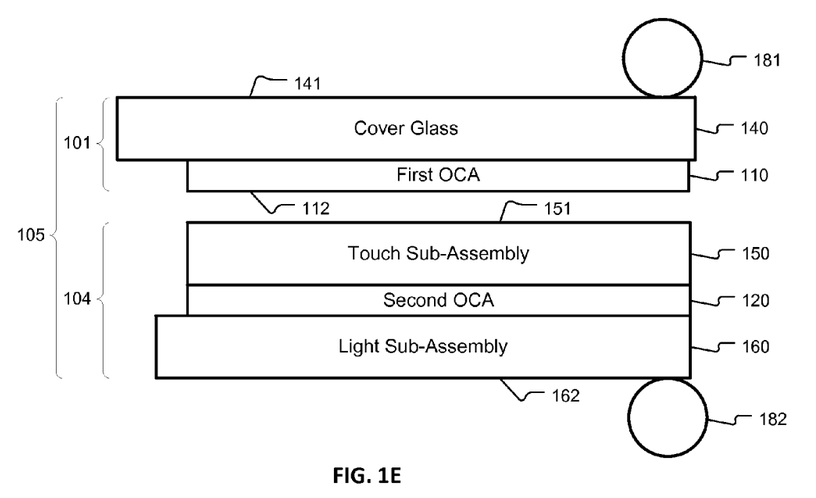
Figure 1F:
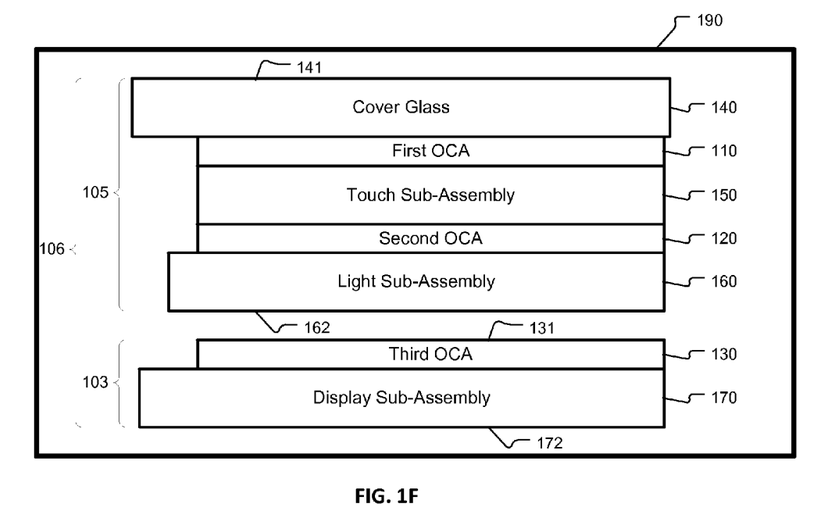
Figure 1G:
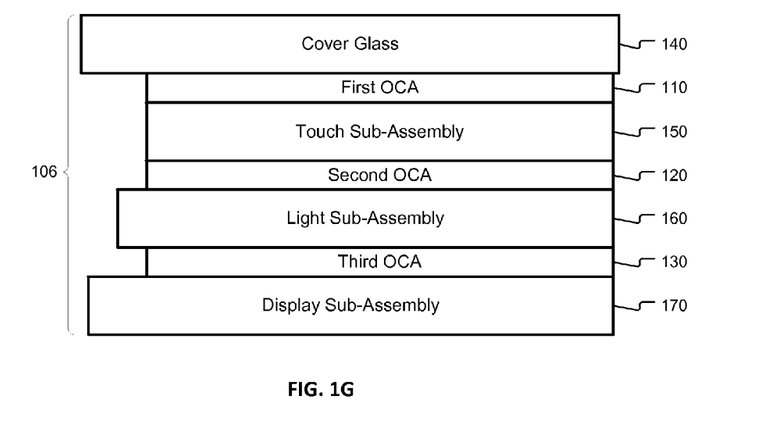
Figure 2:
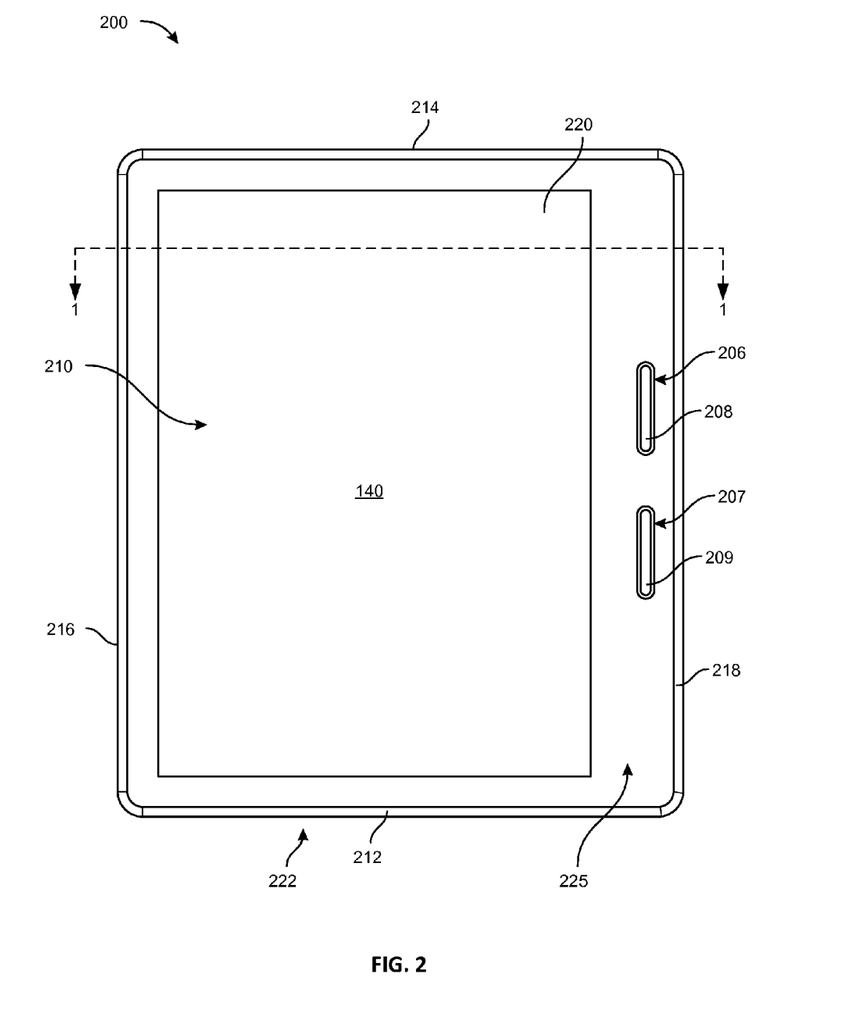
FIG. 2 illustrates an electronic device, in accordance with embodiments of the present invention.

FIGS. 1A-1G illustrate example schematic cross-sectional views of a stack assembly 106 being assembled at line 1-1 of the electronic device depicted in FIG. 2, in accordance with embodiments of the present invention. FIG. 1A illustrates a cover glass 140 and a first OCA film 110 forming a first laminate 101. The cover glass 140 may provide a protective exterior front surface of the electronic device 200, and may comprise a strengthened glass or a toughened glass. Under some embodiments, the cover glass 140 may be made from materials such as glass, fortified glass, reinforced glass, as well as glass imitations such as plastic, thermoplastic and the like. The cover glass 140 may have a first surface 141 and an opposing second surface 142. Under some embodiments, the cover glass may have a thickness of about 550 microns.

The first OCA film 110 has a first surface 111 and an opposing second surface 112, and may be an OCA layer or other bonding material with suitable optical properties. The first OCA film 110 may comprise an acrylic material or the like, having a thickness of about 150 microns. The first OCA film 110 may comprise a material with ultraviolet (UV) cut capabilities, e.g., a material that can block, filter, or absorb light with a wavelength of about 390 nanometers (nm) or lower. Such UV cut material may provide a UV filter function for the purpose of protecting components lower in the stack from UV light that may be incident on the electronic device 200. By filtering the UV light, the UV cut material may enable the display sub-assembly 170 to have reduced discoloration, such as a yellowing discoloration, typically caused by UV light exposure. In addition, it would be desirable for the OCA layer to have a suitable thickness and compressibility as to conform to non-planar surfaces. An example of a suitable first OCA film 110 is part number EA166FG from New Tac Kasei Co., Ltd of Japan.

As illustrated in FIG. 1A, the first laminate 101 is formed by coupling the second surface 142 of the cover glass 140 to the first surface 111 of the first OCA film 110. For example, the cover glass 140 may roll laminated to the first OCA film via a roll laminator comprising a first laminating roller 181 and a second laminating roller 182, which may apply roll pressure to the first laminate 101 of, for example, about 10 to 40 kg total roller force (e.g., 25 kg total roller force) at roll speed of about 50 to 200 mm per second (e.g., 10 mm/sec). The roll pressure to be applied may vary based on the dimensions of the first laminate 101. Although FIG. 1A illustrates first and second laminating rollers 181, 182, alternative embodiments may have a single laminating roller 182 applying a force onto the second surface 112 of the first OCA film 110 and a rigid flat base adjacent to and supporting the first surface 141 of the cover glass 140. The use of dual rollers may be more desirable when laminating two flexible structures, while the use of a single roller and a rigid base may be more desirable when laminating a rigid structure to a flexible structure. Roll lamination technologies are generally well known by those of ordinary skill in the art and, consequently, are not described in detail herein. Examples of a roll laminator include those manufactured by Sun-Tec, Co., Ltd. of Amagasaki, Japan.

FIG. 1B illustrates a touch sub-assembly 150 and a second OCA film 120 forming a second laminate 102. A user may provide user inputs to the device for causing an action to occur on the device by interacting with the touch sub-assembly 150. For example, an action may be turning the page of an electronic book. Interacting with the touch sub-assembly 150 may comprise applying a touch or multiple touches to a portion of the cover glass 140. In some embodiments, the touch sub-assembly 150 may be capable of detecting touches as well as determining an amount of pressure or force of those touches. A touch sub-assembly 150 may comprise a capacitance touch sensitive sensor, an infrared touch screen sensor, a force sensitive resistance sensor, or other touch sensing technology. The touch sub-assembly 150 may have a first surface 151 and an opposing second surface 152. Under some embodiments, the touch sub-assembly may have a thickness of about 250 microns.

The second OCA film 120 has a first surface 121 and an opposing second surface 122, and may be an OCA layer or other bonding material with suitable optical properties. The second OCA film 120 may comprise an acrylic material or the like, having a thickness of about 150 microns. It may be desirable for the second OCA film 120 to be sufficiently flexible as to withstand the stresses caused the expansion and warping of the two surfaces to which the OCA 120 is adhered. Examples of a second OCA film 120 are part numbers 8266, 8146-6, and 2906 from 3M Company of St. Paul, Minn. and part number TE7060 from Hitachi, Ltd. of Japan.

As illustrated in FIG. 1B, the second laminate 102 is formed by coupling the second surface 152 of the touch sub-assembly 150 to the first surface 121 of the second OCA film 120. For example, the second laminate 102 may be formed via a roll laminator comprising the first laminating roller 181 and the second laminating roller 182, which may apply roll pressure to the second laminate 102 of, for example, about 10 to 40 kg total roller force (e.g., 25 kg total roller force) at roll speed of about 50 to 200 mm per second (e.g., 10 mm/sec). The roll pressure to be applied may vary based on the dimensions of the second laminate 102 or other desired manufacturing characteristics. Although FIG. 1B illustrates first and second laminating rollers 181, 182, alternative embodiments may have one or more laminating rollers or the like.

FIG. 1C illustrates a display sub-assembly 170 and a third OCA film 130 forming a third laminate 103. The display sub-assembly 170 may represent an array of display technologies that largely mimic the look of ordinary ink on paper. In contrast to conventional backlit displays, electrophoretic displays typically reflect light, much as ordinary paper does. In addition, electrophoretic displays are bi-stable, meaning that these displays are capable of holding text or other rendered images even when very little or no power is supplied to the display. In some embodiments, the display sub-assembly 170 may comprise an electrophoretic display (EPD), electrowetting display, or a reflective LCD display. Though not shown, in some embodiments, the display sub-assembly 170 may be coupled to a corresponding display controller via a display flexible printed circuit (FPC). The display sub-assembly 170 may have a first surface 171 and an opposing second surface 172. Under some embodiments, the display sub-assembly 170 may have a thickness of about 695 microns.

The third OCA film 130 may be an OCA layer or other bonding material with suitable optical properties. The third OCA film 130 may comprise an acrylic material or the like, having a thickness of about 175 microns. The third OCA film 130 may have a first surface 131 and an opposing second surface 132. Examples of a third OCA film 130 are part numbers 8267, and 2907 from 3M Company of St. Paul, Minn., and part number TE7070 from Hitachi, Ltd. of Japan.

As illustrated in FIG. 1C, the third laminate 103 is formed by coupling the first surface 171 of the display sub-assembly 170 to the second surface 132 of the third OCA film 130. For example, the third laminate 103 may be formed via a roll laminator comprising the first laminating roller 181 and the second laminating roller 182, which may apply roll pressure to the third laminate 103 of, for example, about 10 to 40 kg total roller force (e.g., 25 kg total roller force) at roll speed of about 50 to 200 mm per second (e.g., 10 mm/sec). As described above, the roll pressure to be applied may vary based on the dimensions of the third laminate 103. Although FIG. 1C illustrates first and second laminating rollers 181, 182, alternative embodiments may have one or more laminating rollers or the like.

FIG. 1D illustrates the second laminate 102 and a light sub-assembly 160 forming a fourth laminate 104. The light sub-assembly 160 may direct light to the display sub-assembly 170. For example, directing light to the display sub-assembly 170 may enhance the visibility of displayed content such as by enhancing the contrast of the displayed content. The light sub-assembly 160 may have a first surface 161 and an opposing second surface 162. Under some embodiments, the light sub-assembly 160 may have a thickness of about 400 microns.

As illustrated in FIG. 1D, the fourth laminate 104 is formed by coupling the first surface 161 of the light sub-assembly 160 to the second surface 122 of the second OCA film 120 of the second laminate 102. For example, the fourth laminate 104 may be formed via a roll laminator comprising the first laminating roller 181 and the second laminating roller 182, which may apply roll pressure to the fourth laminate 104 of, for example, about 10 to 40 kg total roller force (e.g., 25 kg total roller force) at roll speed of about 50 to 200 mm per second (e.g., 10 mm/sec). The roll pressure to be applied may vary based on the dimensions of the fourth laminate 104. Although FIG. 1D illustrates first and second laminating rollers 181, 182, alternative embodiments may have one or more laminating rollers or the like.

FIG. 1E illustrates the first laminate 101 and the fourth laminate 104 forming a fifth laminate 105. As illustrated in FIG. 1E, the fifth laminate 105 is formed by coupling the first surface 151 of the touch sub-assembly 150 of the fourth laminate 104 to the second surface 112 of the first OCA film 110 of the first laminate 101. For example, the fifth laminate 105 may be formed via a roll laminator comprising the first laminating roller 181 and the second laminating roller 182, which may apply roll pressure to the fifth laminate 105 of, for example, about 10 to 40 kg total roller force (e.g., 25 kg total roller force) at roll speed of about 50 to 200 mm per second (e.g., 10 mm/sec). The roll pressure to be applied may vary based on the dimensions of the fifth laminate 105. Although FIG. 1E illustrates first and second laminating rollers 181, 182, alternative embodiments may have one or more laminating rollers or the like.

FIG. 1F illustrates the fifth laminate 105 and the third laminate 103 forming the stack assembly 106 or a sixth laminate. As illustrated in FIG. 1F, the stack assembly 106 is formed by coupling the first surface 131 of the third OCA film 130 of the third laminate 103 to the second surface 162 of the light sub-assembly 160 of the fifth laminate 105. For example, the stack assembly 106 may be formed via a vacuum laminator comprising a vacuum chamber 190. Vacuum lamination may be advantageous when the formed laminate includes two rigid sub-assemblies, such as the cover glass 140 and the display sub-assembly 170 illustrated in FIG. 1F. For example, vacuum lamination may reduce the amount of air that may be trapped between sub-assemblies, which may otherwise occur with roll lamination of rigid components. For example, when a formed laminate includes just one rigid sub-assembly, such as the cover glass 140 illustrated in FIG. 1E, the flexible sub-assemblies, such as the touch sub-assembly 150 and the light sub-assembly 160, may facilitate the removal of air from between the sub-assemblies during a roll lamination process in which the flexible sub-assemblies may be caused to bend by a laminating roller to closely conform to the surface of the rigid sub-assembly. However, when coupling two laminates in which each laminate includes a rigid or fragile component, a roll lamination process may be less advantageous as compared to vacuum lamination due to the inflexibility of those two rigid components when attempting to remove air from between the two laminates. Utilizing a laminating roller to compress two rigid components together may result in air pockets being formed between the two components or cracking or other damage to one or both of the rigid components caused by the applied force of the roller. With vacuum lamination, or suction lamination, the components of a laminate are drawn together using a vacuum force instead of an applied roller force, which may be advantageous to reduce the trapping of air between the two components due to slight, microscopic undulations between the two surfaces of the components.

For a stack assembly for use in a device with a six inch display, the vacuum chamber 190 may apply a vacuum level of, for example, about 10 to 100 pascals, a vacuum hold time of about 1 to 10 seconds, a vacuum lamination force of about 1 to 2.5 kg per square centimeter, and a vacuum lamination hold time of about 2 to 20 seconds. For larger displays, high vacuum levels may be utilized. Vacuum lamination technologies are generally well known by those of ordinary skill in the art and, consequently, are not described in detail herein.

FIG. 1G illustrates the stack assembly 106 comprising the cover glass 140 coupled to the first OCA film 110, which is coupled to the touch sub-assembly 150, which is coupled to the second OCA film 120, which is coupled to the light sub-assembly 160, which is coupled to the third OCA film 130, which is coupled to the display sub-assembly 170.

FIG. 2 illustrates an electronic device 200, such as an electronic reader device, in accordance with embodiments of the present invention. The electronic device 200 comprises the cover glass 140 and a touch-sensitive front-lit display 210 comprising the touch sub-assembly 150, the light sub-assembly 160, and the display sub-assembly 170. The touch-sensitive front-lit display 210 may be coupled to the cover glass 140, through which images, content, or content items produced by the display sub-assembly 170 may be viewed by a user.

In some embodiments, a display mask 225 may be adhered to the underside of the cover glass 140 to hide from a user's view the components of the electronic device 200 that are underneath the display mask 225. As illustrated in FIG. 2, the display mask may hide certain components beneath portions of the cover glass 140, while allowing the images of the touch-sensitive front-lit display 210 to be viewable. The electronic device 200 may comprise a bottom side portion 212, a top side portion 214, a left side portion 216, a right side portion 218, a front portion 220, and a back portion 222. It is to be understood that references to positions of the electronic device 200, such as top, bottom, left, right, front, and back are for illustrative purposes, and are not to be considered limiting.

The electronic device 200 may comprise a first button 208 and a second button 209, which may be used as page turn control buttons actuated by a user to turn a page of an electronic book. The cover glass 140 may comprise a first aperture 206 and a second aperture 207 within which the first button 208 and the second button 209 respectively reside. The electronic device 200 may have no physical buttons, one physical button, or more than two physical buttons in various embodiments, depending on the desired user interface. In the embodiment illustrated in FIG. 2, the symmetric design of the page turn buttons may be advantageous to allow a user to hold the electronic device 200 with the right hand, and based on the screen orientation, the second button 209 may be depressed by the thumb of the user to turn to a next page of a book, and the first button 208 may be depressed by the thumb of the user to turn to a previous page of the book. Furthermore, if the device is rotated by a user to be held in the left hand, then based on the screen orientation, the first button 208 may be depressed to turn to a next page of the book and the second button 209 may be depressed to turn to a previous page of the book.

Figure 3A:
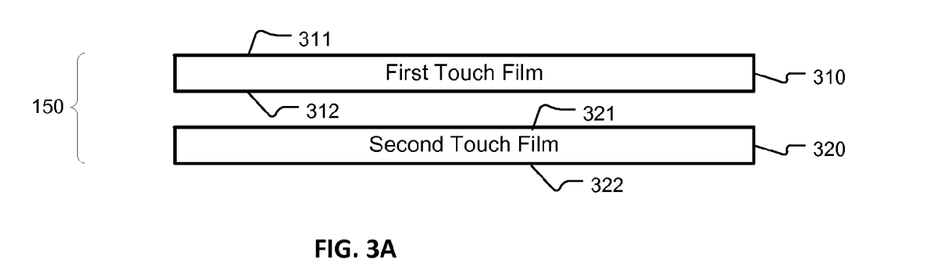
FIGS. 3A-3C illustrate exploded schematic cross-section views of components of a stack assembly, in accordance with embodiments of the present invention.
Figure 3B:
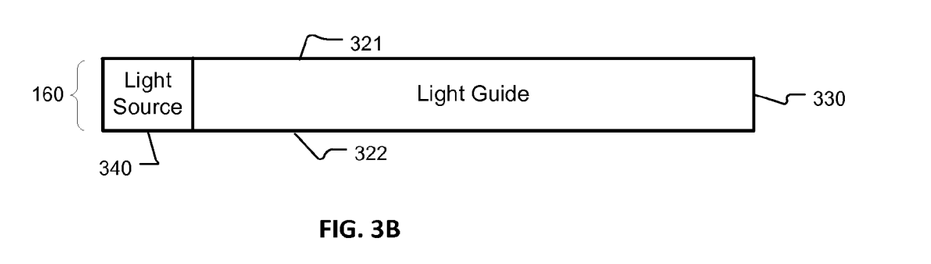
Figure 3C:
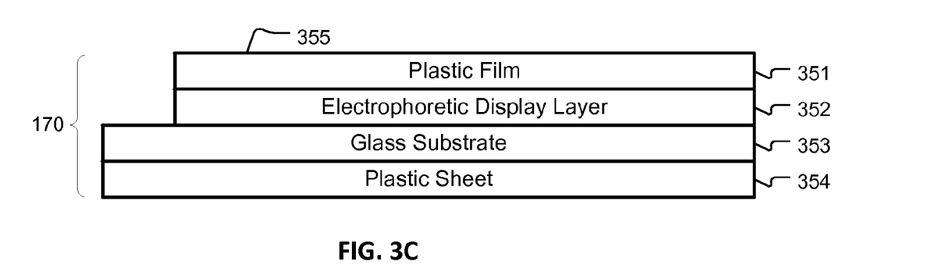

FIGS. 3A-3C illustrate exploded schematic cross-section views of components of a stack assembly 106 at line 1-1 of the electronic device depicted in FIG. 2, in accordance with embodiments of the present invention. FIG. 3A illustrates the touch sub-assembly 150 comprising a first touch film 310 and a second touch film 320 adhered to the first touch film 310, for example, with a liquid OCA or the like. The first touch film 310 may have a first surface 311 and an opposing second surface 312. Under some embodiments, the first surface 151 of the touch sub-assembly 150 may comprise the first surface 311 of the first touch film 310. The second touch film 320 may have a first surface 321 and an opposing second surface 322. Under some embodiments, the second surface 152 of the touch sub-assembly 150 may comprise the second surface 322 of the second touch film 320. As illustrated in FIG. 3A, the second surface 312 of the first touch film 310 may be coupled to the first surface 321 of the second touch film 320. Although not shown, the touch sub-assembly 150 may include a touch flexible printed circuit (FPC) that may couple with the display FPC of the display sub-assembly 170.

The touch films 310, 320 may comprise a polyethylene terephthalate (PET) material. In some embodiments, the touch films 310, 320 may comprise patterns of electrodes made from indium tin oxide (ITO), copper, printed ink or the like, and the patterns may form rows and columns. Such electrode grid patterns may provide a grid of capacitors that may project an electric field through the cover glass 140, and the capacitance of one or more capacitors may be changed by the placement of a finger near the cover glass 140. The number of touch films of the touch sub-assembly 150 described herein is not meant to be limiting, and any number of touch films may be used, such as four touch films with each having an electrode grid.

FIG. 3B illustrates the light sub-assembly 160 comprising one or more light sources 340 and a light guide 330 that directs light to the display sub-assembly 170. Although not shown, the light sub-assembly 160 may comprise a light FPC that is electrically coupled to the light sources 340 and is mechanically coupled to the light guide 330. The light FPC may be coupled to the display FPC of the display sub-assembly. The light guide 330 may have a first surface 321 and an opposing second surface 322. Under some embodiments, the first surface 161 of the light sub-assembly 160 may comprise the first surface 321 of the light guide 330 and the second surface 162 of the light sub-assembly 160 may comprise the second surface 322 of the light guide 330.

The light guide 330 may be a light guide film or a light guide panel which may include light defractive elements, such as grating elements, for directing light from the light source 340 onto the display sub-assembly 170, thus illuminating the display sub-assembly 170. The light guide 330 may comprise a planar polycarbonate material, polymethyl methacrylate (PMMA) material, or the like. A light defractive element may be a protrusion, a ridge, a bulge, a channel, a groove, or the like of the light guide 330. Under some embodiments, the light guide 330 may include light refractive elements, such as a lenslet or a small lens. A light guide 330 comprising a polycarbonate material may have certain advantages because it may be coupled to an OCA film comprising acrylic material, which has a preferable refractive index differential with respect to the polycarbonate material. In comparison, a light guide 330 comprising a PMMA material may not have such a refractive index differential advantage with respect to an OCA film comprising acrylic material. For example, if a light guide 330 comprises a PMMA material, it may be preferable to use a liquid OCA comprising a silicone material, based on the refractive index differential of such materials.

The light source 340 may comprise one or more LEDs, such as ten LEDs, which may reside toward a side edge of the electronic device 200, such as the right side portion 218. The light source 340 may be coupled to an edge of the light guide 330, and light from the light source 340 may generally travel along the plane of the light guide 330 and the display sub-assembly 170 until, for example, it contacts defractive or refractive elements, which generally direct the light downwards or towards the display sub-assembly 170. In some instances, the multiple LEDs are positioned such that they collectively emulate a single point source. For example, each LED may emit light over a particular angle that is in the shape of a triangle. The LEDs may be aligned and spaced (relative to one another and relative to an active area of the display) such that these triangular shapes of emitted light overlap in a manner such that the display does not include overly bright spots or overly dim spots. An LED may be coupled to the light FPC, which may be laminated to the light guide 330 with a narrow strip of OCA film comprising an acrylic material.

In some embodiments, a refractive index of the second OCA film 120 may be less than a refractive index of the light guide 330. For example, the difference between the refractive index of the light guide 330 and the refractive index of the second OCA film 120 may be at least 0.1. In some embodiments, the difference can be 0.3. For example, if the light guide 330 has a refractive index of 1.58, then the refractive index of the second OCA film 120 may be 1.48. The selection of the material of the light guide 330, where the material has a refractive index, may be used to determine the appropriate refractive index of the second OCA film 120. It is also to be understood that other OCA films, such as the third OCA film 130, may also have a refractive index that is less than the refractive index of the light guide 330.

FIG. 3C illustrates the display sub-assembly 170 comprising a display glass substrate 353, such as a flexible sheet of glass or a sheet of glass having a thickness of about 0.2 mm. In some embodiments, the display glass substrate 353 may have a thickness that ranges from about 0.025 mm to about 0.2 mm. A display plastic sheet 354 may be adhered to a surface of the display glass substrate 353 via, for example a pressure sensitive adhesive (PSA). The display plastic sheet 354 may comprise a polyethylene terephthalate (PET) material or the like. The display glass substrate 353 may be flexible, supple, elastic, giving, springy, or the like, such that the display glass substrate 353 may be capable to bend during usage before shattering or breakage may occur. A display glass substrate 353 having a thickness of about 0.2 mm may be advantageous because such a display glass substrate 333 may be thin enough to be flexible. The display plastic sheet 354 may be advantageous to support the display glass substrate 353 from bending or flexing beyond an amount in which shattering or breakage may occur. The display plastic sheet 354 may be advantageous during assembly of the stack assembly 106 to protect the display glass substrate 353 from scratches, fractures, chips, or impacts that may cause the display glass substrate 353 to otherwise break. For example, the display plastic sheet 354 may be advantageous for being less brittle than the display glass substrate 353. In some embodiments, a plastic sheet or other flexible substrate material may be utilized instead of the display glass substrate 353 and the display plastic sheet 354.

The electrophoretic display (EPD) layer 352 or display ink layer may be adhered to the display glass substrate 353. The EPD layer 352 may comprise a laminate as is commonly known in the art for e-ink displays. In some embodiments, the EPD layer 352 may comprise micro-capsules having positively charged white pigment or particles and negatively charged black pigment or particles suspended within a clear fluid such as oil. The EPD layer 352 may also comprise top and bottom electrodes. For example, a thin-film-transistor (TFT) layer may be above the top of the display glass substrate 353, and beneath the bottom of a display plastic film 351 there may be a single electrode which may be a common electrode. Such top and bottom electrodes may apply a positive or negative electric field such that corresponding particles move to the top of the microcapsule where they become visible to the user. The display plastic film 351 may be positioned over the EPD layer 352. The display plastic film 351 may be adhered to the EPD layer via a liquid OCA. Although the display plastic film 351 is illustrated as a separate layer from the EPD layer 352, in some embodiments, the EPD layer 352 may comprise the display plastic film 351. The display plastic film 351 may comprise a polyethylene terephthalate (PET) material or the like, and may have a surface 355. The first surface 171 of the display sub-assembly 170 may comprise the surface 355 of the display plastic film 351.

Although not shown, the display sub-assembly 170 may comprise a display FPC that is mechanically coupled to the display glass substrate 353 and electrically coupled to the EPD layer 352. The display FPC may be coupled to the light FPC of the light sub-assembly 160 and the touch FPC of the touch sub-assembly 150. The first button 208 and the second button 209 may be coupled to the display FPC, and the display FPC may be coupled to a processor of the electronic device 200.

FIGS. 4A-4D illustrate example flow diagrams for assembling a stack assembly, in accordance with embodiments of the present invention. The order in which the operations are described is not intended to be construed as a limitation, and any number of the described operations can be combined in any order and/or in parallel to implement the process.

Figure 4A:
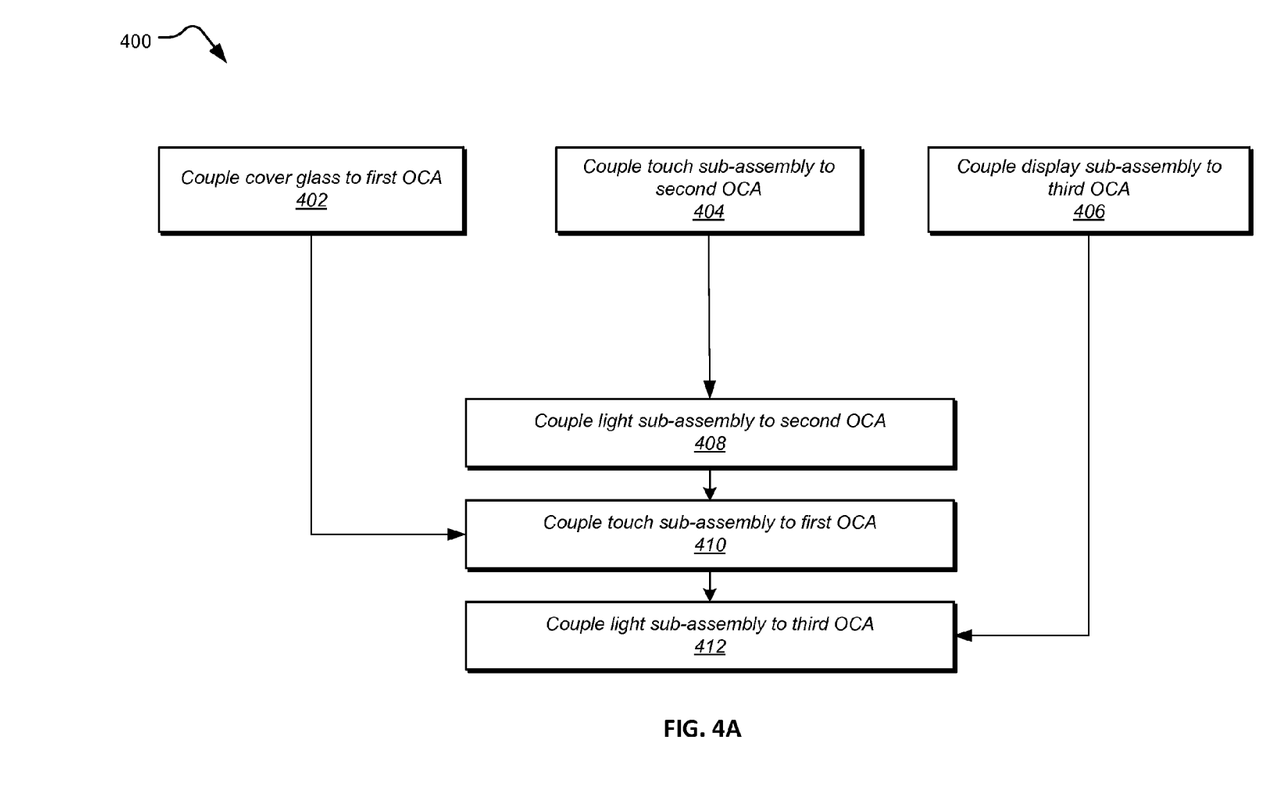
FIGS. 4A-4D illustrate example flow diagrams for assembling a stack assembly, in accordance with embodiments of the present invention.

FIG. 4A illustrates an example flow diagram 400 of a method for assembling the stack assembly 106. At step 402, the cover glass 140 is coupled to the first OCA film 110 via roll lamination to form the first laminate 101. At step 404, the touch sub-assembly 150 is coupled to the second OCA film 120 via roll lamination to form the second laminate 102. At step 406, the display sub-assembly 170 is coupled to the third OCA film 130 via roll lamination to form the third laminate 103. In various embodiments, step 402, step 404, and step 406 may be performed in parallel or in any order in relation to each other. At step 408, the light sub-assembly 160 is coupled to the second OCA film 120 via roll lamination to form the fourth laminate 104. At step 410, the touch sub-assembly 150 is coupled to the first OCA film 110 via roll lamination to form the fifth laminate 105. At step 412, the light sub-assembly 160 is coupled to the third OCA film 130 via vacuum lamination to form the stack assembly 106.

Figure 4B:
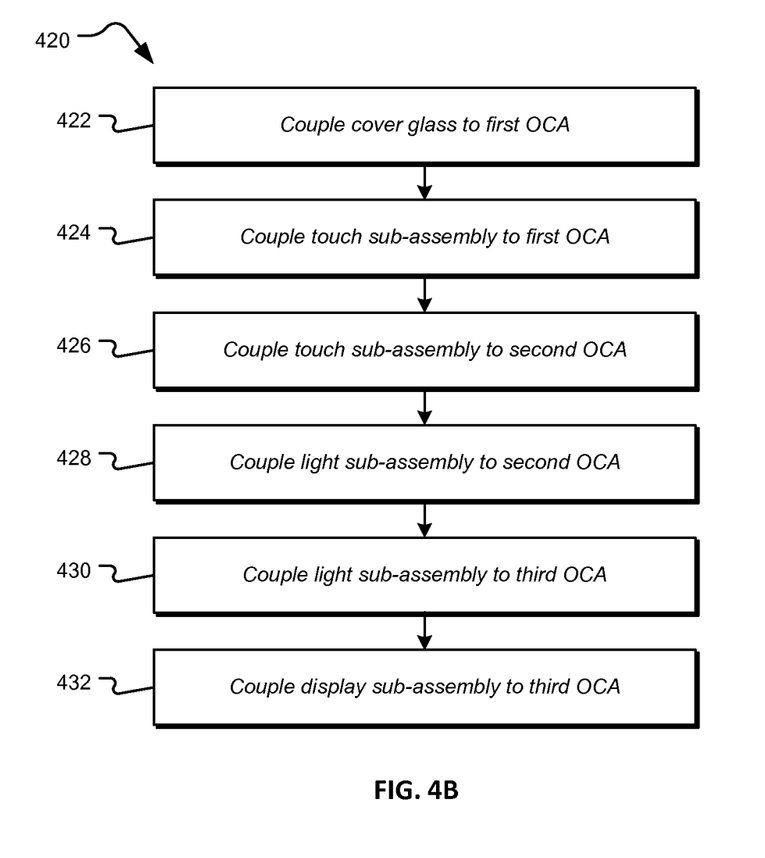

FIG. 4B illustrates an example flow diagram 420 of an alternative method for assembling the stack assembly 106 illustrated in FIG. 1G. At step 422, the cover glass 140 is coupled to the first OCA film 110 via roll lamination. At step 424, the touch sub-assembly 150 is coupled to the first OCA film 110 via roll lamination. At step 426, the touch sub-assembly 150 is coupled to the second OCA film 120 via roll lamination. At step 428, the light sub-assembly 160 is coupled to the second OCA film 120 via roll lamination. At step 430, the light sub-assembly 160 is coupled to the third OCA film 130 via roll lamination. At step 432, the display sub-assembly 170 is coupled to the third OCA film 130 via vacuum lamination to form the stack assembly 106.

Figure 4C:
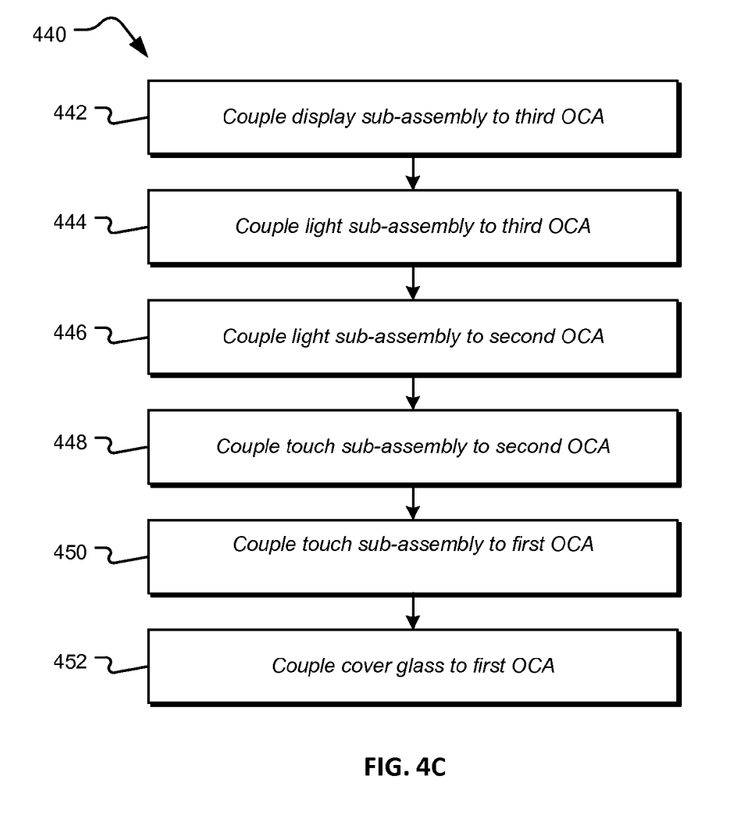

FIG. 4C illustrates an example flow diagram 440 of an alternative method for assembling the stack assembly 106 illustrated in FIG. 1G. At step 442, the display sub-assembly 170 is coupled to the third OCA film 130 via roll lamination. At step 444, the light sub-assembly 160 is coupled to the third OCA film 130 via roll lamination. At step 446, the light sub-assembly 160 is coupled to the second OCA 120 via roll lamination. At step 448, the touch sub-assembly 150 is coupled to the second OCA 120 via roll lamination. At step 450, the touch sub-assembly 150 is coupled to the first OCA 110 via roll lamination. At step 452, the cover glass 140 is coupled to the first OCA 110 via vacuum lamination to form the stack assembly 106.

Figure 4D:
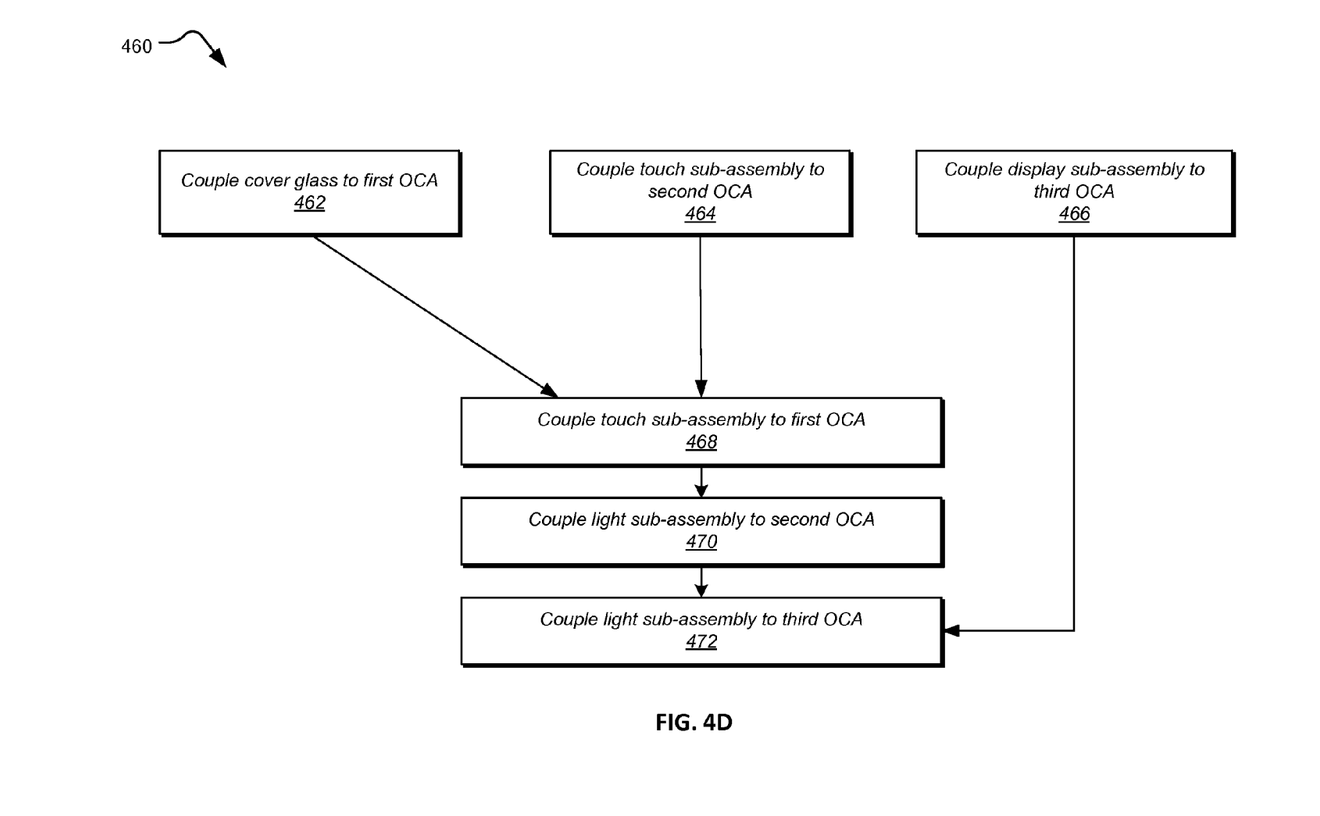

FIG. 4D illustrates an example flow diagram 460 of an alternative method for assembling the stack assembly 106 illustrated in FIG. 1G. At step 462, the cover glass 140 is coupled to the first OCA film 110 via roll lamination. At step 464, the touch sub-assembly 150 is coupled to the second OCA film 120 via roll lamination. At step 466, the display sub-assembly 170 is coupled to the third OCA film 130 via roll lamination. In various embodiments, step 462, step 464, and step 466 may be performed in parallel or in any order in relation to each other. At step 468, the touch sub-assembly 150 is coupled to the first OCA film 110 via roll lamination. At step 470, the light sub-assembly 160 is coupled to the second OCA film 120 via roll lamination. At step 472, the light sub-assembly 160 is coupled to the third OCA film 130 via vacuum lamination to form the stack assembly 106.

The roll lamination described in relation to FIGS. 4A-4D may be similar to the roll lamination described in relation to FIGS. 1A-1G. For example, the roll lamination of FIGS. 4A-4D may be via a roll laminator, which may apply roll pressure of, for example, about 10 to 40 kg total roller force (e.g., 25 kg total roller force) at roll speed of about 50 to 200 mm per second (e.g., 10 mm/sec). It is to be further understood that the vacuum lamination described in relation to FIGS. 4A-4D may be similar to the vacuum lamination described in relation to FIGS. 1A-1G. For example, the vacuum lamination of FIGS. 4A-4D may be via a vacuum laminator, which may apply a vacuum level of about 10 to 100 pascals, a vacuum hold time of about 1 to 10 seconds, a vacuum lamination force of about 1 to 2.5 kg per square centimeter, and a vacuum lamination hold time of about 2 to 20 seconds.

Figure 5:
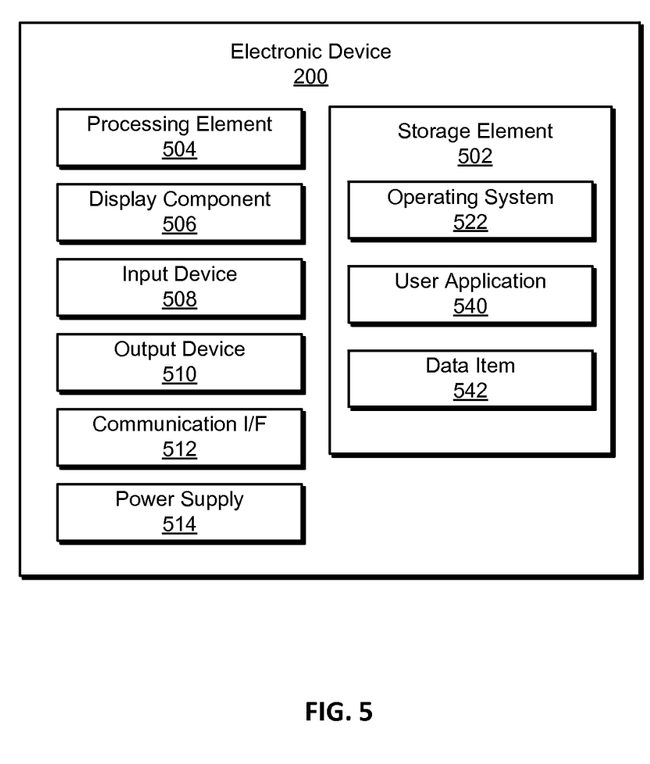
FIG. 5 illustrates an example block diagram of an electronic device, in accordance with embodiments of the present invention.

FIG. 5 illustrates an example block diagram of an electronic device 200, in accordance with embodiments of the present invention. The electronic device 200 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 200 may include a display component 506. The display component 506 may comprise, for example, one or more devices such as cathode ray tubes (CRTs), liquid crystal display (LCD) screens, gas plasma-based flat panel displays, LCD projectors, or other types of display devices, etc. The electronic device 200 may include one or more input devices 508 operable to receive inputs from a user. The input devices 508 can include, for example, a push button, touch pad, touch screen, wheel, joystick, keyboard, mouse, trackball, keypad, accelerometer, light gun, game controller, or any other such device or element whereby a user can provide inputs to the electronic device 200. These input devices 508 may be incorporated into the electronic device 200 or operably coupled to the electronic device 200 via wired or wireless interface. For computing devices with touch sensitive displays, the input devices 508 can include a touch sensor that operates in conjunction with the display component 506 to permit users to interact with the image displayed by the display component 506 using touch inputs (e.g., with a finger or stylus). The electronic device 200 may also include an output device 510, such as one or more audio speakers.

The electronic device 200 may also include at least one communication interface 512 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 200 may also include one or more wired communications interfaces for coupling and communicating with other devices, such as a USB port. The electronic device 200 may also include a power supply 514, such as, for example, a rechargeable battery operable to be recharged through conventional plug-in approaches, or through other approaches such as capacitive charging.

The electronic device 200 may also include a processing element 504 for executing instructions and retrieving data stored in a storage element 502 or memory. As would be apparent to one of ordinary skill in the art, the storage element 502 can include one or more different types of memory, data storage or computer-readable storage media, such as, for example, a first data storage for program instructions for execution by the processing element 504, and a second data storage for images or data and/or a removable storage for transferring data to other devices. The storage element 502 may store software for execution by the processing element 504, such as, for example, operating system software 522 and user applications 540. The storage element 502 may also store a data item 542, such as, for example, data files corresponding to one or more applications 540.

Embodiments of the present invention may provide various advantages not provided by prior art systems. An exemplary advantage of some disclosed embodiments of an electronic device 200 may be the parallel assembly of the first laminate 101, the second laminate 102, and the third laminate 103, such that an assembly error of one of those laminates 101, 102, 103 does not affect the other two laminates. This can reduce overall rework costs because only one of the laminates 101-103 would need to be scrapped and replaced, instead of all three. For example, with respect to step 402 and step 404 of FIG. 4A, if the coupling of the cover glass 140 to the first OCA film 110 of step 402 is properly done, but if the coupling of the touch sub-assembly 150 to the second OCA film 120 of step 404 is improperly done, then such an improper second laminate 102 with touch sub-assembly 150 may be discarded without affecting the proper laminate 101 with the cover glass 140 due to the parallel coupling of components. In contrast, if after the first laminate 101 is formed, and the touch sub-assembly were to be coupled to the first laminate 101, and thereafter the touch sub-assembly 150 were to be improperly coupled to the second OCA 120, then both the cover glass 140 and the touch sub-assembly 150 are damaged due to the sequential coupling of components. Another exemplary advantage of some disclosed embodiments is the use of a OCA film, which may have certain benefits over a liquid OCA requiring an ultraviolet light curing process. For example, a OCA film may have advantages over a liquid OCA comprising a UV cut material, because with such liquid OCA, the ultraviolet light curing process may be hampered by the UV cut material. Another exemplary advantage of some disclosed embodiments is that OCA film may be applied to a component with less rework than liquid OCA. For example, liquid OCA may flow, spread, or leak beyond the intended surface on which such liquid OCA was intended to be applied. Such flow of liquid OCA beyond its intended area may lead to additional handling costs, potential damage, or reliability issues While the invention has been described in terms of particular embodiments and illustrative figures, those of ordinary skill in the art will recognize that the invention is not limited to the embodiments or figures described. Many of the embodiments described above in relation to OCA film may be applied to UV curable OCA. For example, one or more of the OCA films 110, 120, 130 of the stack assembly 106 may be replaced with an ultraviolet (UV) light curable OCA that is a liquid OCA, a OCA film, or the like. Such UV light curable OCA may be cured by a UV lamp producing UV light having a wavelength of about 365 nm, about 385 nm, or about 405 nm. Such a UV lamp may be comprised of at least one LED configured to emit UV light with a wavelength of about 365 nm, about 385 nm, about 405 nm, or the like. Under some embodiments, a UV light dose may be about 3 joules per square centimeter (J/sq.cm), or may have a range of about 0 J/sq.cm to about 10 J/sq.cm. Curing with UV light having a wavelength of about 365 nm, about 385 nm, or about 405 nm may be particularly advantageous where a UV curable OCA, such as a liquid OCA, is used with a component of the stack assembly 106 that comprises a polycarbonate material. For example, if the light guide 330 comprises a planar polycarbonate material, the transparency of such a light guide 330 may be maintained or have a reduced coloration when the UV curable OCA is cured with UV light having a wavelength of about 365 nm, about 385 nm, or about 405 nm. In comparison, when OCA is UV cured with a full UV spectra light, such as with a Fusion "D"-type bulb, the polycarbonate material may be caused to have an increase in color, such as having an undesirable yellow color. Such an undesirable yellow color may occur with a small exposure to full UV spectra light. Accordingly, it may be advantageous to use UV curable OCA, such as a liquid OCA, with polycarbonate components or film of the display stack 106, where the UV curable OCA is cured with UV light having a wavelength of about 365 nm, about 385 nm, or about 405 nm. In other embodiments, instead of utilizing a light source generating light within a particular wavelength range, a full UV spectra light may be used with a filter to produce the desired wavelength for curing.

Although the processes, flowcharts and methods described herein may describe a specific order of execution, it is understood that the order of execution may differ from that which is described. For example, the terms "first," "second," and "third" when used to identify the various OCA films herein do not necessarily require that the OCA films be applied in any particular order. Accordingly, the third OCA film 130 described above as being applied to the display sub-assembly 170 may alternatively be referred to as a first OCA film or just an OCA film. It is to be understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of manufacturing a display stack assembly for an electronic device, comprising:
   roll laminating a first optically clear adhesive (OCA) film to a rigid cover glass;
   roll laminating a second OCA film to a touch sub-assembly, the touch sub-assembly being configured to receive touch input;
   roll laminating a third OCA film to a reflective display sub-assembly;
   roll laminating a planar light guide to the second OCA film to couple the planar light guide to the touch sub-assembly;
   roll laminating the touch sub-assembly to the first OCA film to couple the rigid cover glass to the touch sub-assembly and the planar light guide; and after roll laminating the planar light guide to the second OCA film, vacuum laminating the planar light guide to the third OCA film to couple the reflective display sub-assembly to the planar light guide, the touch sub-assembly, and the rigid cover glass.

2. The method of claim 1, wherein:
the planar light guide comprises a polycarbonate material;
the first OCA film comprises a first acrylic material having an ultraviolet blocking characteristic and a first thickness of about 150 microns;
the second OCA film comprises a second acrylic material having a second thickness of about 150 microns; and
the third OCA film comprises a third acrylic material having a third thickness of about 175 microns to the reflective display sub-assembly.

3. The method of claim 1, further comprising:
roll laminating the first OCA film to the rigid cover glass prior to roll laminating the touch sub-assembly to the first OCA film;
roll laminating the second OCA film to the touch sub-assembly prior to roll laminating roll laminating the planar light guide to the second OCA film;
roll laminating the third OCA film to the reflective display sub-assembly prior to vacuum laminating the planar light guide to the third OCA film;
roll laminating the planar light guide to the second OCA film prior to roll laminating the touch sub-assembly to the first OCA film; and
roll laminating the touch sub-assembly to the first OCA film prior to vacuum laminating the planar light guide to the third OCA film.

4. An electronic device comprising:
a display sub-assembly;
a light sub-assembly coupled to the display sub-assembly via a first optically clear adhesive (OCA);
a touch sub-assembly directly coupled to the light sub-assembly via a second OCA; and
a cover glass directly coupled to the touch sub-assembly via a third OCA.

5. The electronic device of claim 4, wherein:
the first OCA comprises a first acrylic material having a first thickness of between about 50 microns and about 150 microns;
the second OCA comprises a second acrylic material having a second thickness of between about 50 microns and 150 microns; and
the third OCA comprises a third acrylic material having a third thickness of between about 50 microns and 175 microns.

6. The electronic device of claim 4, wherein the first OCA has an ultraviolet blocking characteristic.

7. The electronic device of claim 4, wherein the touch sub-assembly comprises:
a first touch film having a first electrode grid;
a second touch film having a second electrode grid, the first touch film being coupled to the second touch film; and
wherein the first touch film is coupled to the first OCA, and the second touch film is coupled to the second OCA.

8. The electronic device of claim 4, wherein the light sub-assembly comprises:
a planar light guide coupled to the second OCA and the first OCA, wherein the planar light guide comprises a polycarbonate material; and
a light source positioned at an edge of the planar light guide.

9. The electronic device of claim 4, wherein:
the first OCA comprises a first OCA film;
the second OCA comprises a second OCA film; and
the third OCA comprises a third OCA film.

10. The electronic device of claim 4, wherein:
the display sub-assembly comprises a display glass substrate coupled to an electrophoretic display (EPD) layer.

11. A method comprising:
coupling a first optically clear adhesive (OCA) film to a cover glass;
coupling a second OCA film to a touch sub-assembly, the touch sub-assembly being configured to receive touch input;
coupling a third OCA film to a display sub-assembly;
coupling a light sub-assembly to the second OCA film;
coupling the touch sub-assembly to the first OCA film; and
after coupling the light sub-assembly to the second OCA film, coupling the light sub-assembly to the third OCA film.

12. The method of claim 11, wherein:
coupling the cover glass to the first OCA film prior to coupling the light sub-assembly to the second OCA film;
coupling the touch sub-assembly to the second OCA film prior to coupling the light sub-assembly to the second OCA film;
coupling the display sub-assembly to the third OCA film prior to coupling the light sub-assembly to the second OCA film;
coupling the light sub-assembly to the second OCA film prior to coupling the touch sub-assembly to the first OCA film; and
coupling the touch sub-assembly to the first OCA film prior to coupling the light sub-assembly to the third OCA film.

13. The method of claim 12, wherein:
coupling the cover glass to the first OCA film comprises roll laminating the cover glass to the first OCA film;
coupling the touch sub-assembly to the second OCA film comprises roll laminating the touch sub-assembly to the second OCA film;
coupling the display sub-assembly to the third OCA film comprises roll laminating the display sub-assembly to the third OCA film;
coupling the light sub-assembly to the second OCA film comprises roll laminating the light sub-assembly to the second OCA film;
coupling the touch sub-assembly to the first OCA film comprises roll laminating the touch sub-assembly to the first OCA film; and
coupling the light sub-assembly to the third OCA film comprises vacuum laminating the light sub-assembly to the third OCA film.

14. The method of claim 13, further comprising:
roll laminating the cover glass to the first OCA film, roll laminating the touch sub-assembly to the second OCA film, roll laminating the display sub-assembly to the third OCA film, roll laminating the light sub-assembly to the second OCA film, and roll laminating the touch sub-assembly to the first OCA film are formed are performed via a roll laminator configured to have a roll pressure of about 10 to about 40 kg of total force and a roll speed of about 50 to about 200 mm per second; and vacuum laminating the light sub-assembly to the third OCA film with a vacuum laminator configured to have a vacuum level of about 10 to about 100 Pa, a vacuum hold time of about 1 to about 10 seconds, a lamination force of about 1 to about 2.5 kg per square cm, and a lamination hold time of about 2 to about 20 seconds.

15. The method of claim 11, further comprising:
coupling the cover glass to the first OCA film prior to coupling the touch sub-assembly to the first OCA film;
coupling the touch sub-assembly to the first OCA film prior to coupling the touch sub-assembly to the second OCA film;
coupling the touch sub-assembly to the second OCA film prior to coupling the light sub-assembly to the second OCA film; and
coupling the light sub-assembly to the third OCA film prior to coupling the display sub-assembly to the third OCA film.

16. The method of claim 11, wherein:
the first OCA film comprises a first acrylic material having an ultraviolet blocking characteristic and a first thickness of between about 50 microns and about 150 microns;
the second OCA film comprises a second acrylic material having a second thickness of between about 50 microns and 150 microns; and
the third OCA film comprises a third acrylic material having a third thickness of between about 50 microns and 175 microns.

17. The method of claim 11, wherein:
coupling the first OCA film to the cover glass comprises coupling the first OCA film to strengthened glass; and
coupling the light sub-assembly to the second OCA film comprises coupling a polycarbonate light guide to the second OCA film, the polycarbonate light guide being coupled to a light source and configured to direct light from the light source to the display sub-assembly.

18. The method of claim 11, wherein:
after coupling the display sub-assembly to the third OCA film, coupling the light sub-assembly to the third OCA film;
after coupling the light sub-assembly to the second OCA film, coupling the touch sub-assembly to the second OCA film;
after coupling the touch sub-assembly to the second OCA film, coupling the touch sub-assembly to the first OCA film; and
after coupling the touch sub-assembly to the first OCA film, coupling the cover glass to the first OCA film.

19. The method of claim 11, further comprising:
coupling the cover glass to the first OCA film prior to coupling the touch sub-assembly to the first OCA film;
coupling the touch sub-assembly to the second OCA film prior to coupling the touch sub-assembly to the first OCA film;
coupling the display sub-assembly to the third OCA film prior to coupling the touch sub-assembly to the first OCA film; and
coupling the light sub-assembly to the second OCA film prior to coupling the touch sub-assembly to the first OCA film.

20. The method of claim 11, wherein:
the touch sub-assembly comprises a first touch film having a first electrode grid and a second touch film having a second electrode grid, the first touch film being coupled to the second touch film;
coupling the touch sub-assembly to the first OCA film comprises coupling the first touch film to the first OCA film; and
coupling the touch sub-assembly to the second OCA film comprises coupling the second touch film to the second OCA film.

* * * * *

UNITED STATES PATENT AND TRADEMARK OFFICE
CERTIFICATE OF CORRECTION

PATENT NO.         : 9,990,064 B2
APPLICATION NO.    : 14/667389
DATED              : June 5, 2018
INVENTOR(S)        : Robert L. D. Zenner and Chin Siong Khor

Page 1 of 1

It is certified that error appears in the above-identified patent and that said Letters Patent is hereby corrected as shown below:

In the Claims

Claim 3, Column 13, Line 21, replace "roll laminating roll laminating" with "roll laminating"

Signed and Sealed this
Thirty-first Day of July, 2018

Andrei Iancu
*Director of the United States Patent and Trademark Office*